United States Patent
Bonko et al.

(10) Patent No.: US 6,352,320 B1
(45) Date of Patent: Mar. 5, 2002

(54) DIRECTIONAL ANNULAR ELASTIC TRACK

(75) Inventors: Mark Leonard Bonko, Uniontown; Richard Alan Thomas, Hartville, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/596,592

(22) Filed: Jun. 19, 2000

(51) Int. Cl.$^7$ ................................ B62D 55/24
(52) U.S. Cl. ...................... 305/178; 305/165
(58) Field of Search ..................... 305/157, 158, 305/160, 165, 167–178, 180

(56) References Cited

U.S. PATENT DOCUMENTS

| | | | | |
|---|---|---|---|---|
| 2,738,236 A | * | 3/1956 | Haushalter | |
| 3,730,245 A | | 5/1973 | Kusunoki et al. | 152/352 |
| 3,825,052 A | | 7/1974 | Matsuyama et al. | 152/353 |
| 3,857,617 A | * | 12/1974 | Grawley | |
| 3,939,890 A | | 2/1976 | Abe | 152/209 B |
| 4,438,982 A | | 3/1984 | Pettersson | 305/35 EB |
| 4,560,211 A | | 12/1985 | Van Der Lely | 305/35 EB |
| 4,906,054 A | * | 3/1990 | Edwards et al. | |
| 5,380,076 A | * | 1/1995 | Hori | |
| 5,427,443 A | | 6/1995 | Muramatsu et al. | 254/126 |
| 5,536,464 A | | 7/1996 | Muramatsu | 264/254 |
| 5,632,537 A | * | 5/1997 | Yoshimura et al. | |
| 6,068,354 A | * | 5/2000 | Akiyama et al. | |

FOREIGN PATENT DOCUMENTS

| | | | | |
|---|---|---|---|---|
| JP | 55-72469 | * | 5/1980 | 305/165 |
| JP | 6-72362 | * | 3/1994 | 305/169 |

OTHER PUBLICATIONS

Firestone Track on Roadtec Asphalt Paver 9/99.

* cited by examiner

*Primary Examiner*—Russell D. Stormer
(74) *Attorney, Agent, or Firm*—David L King

(57) ABSTRACT

This invention relates to an annular elastic track 10 for use in vehicles for civil engineering, construction works and agricultural works. The track 10 has a plurality of spaced rubber tread lugs 30, each having a first lateral end portion 30B, a middle portion 30M and a second lateral end portion 30C, each portion 30B, 30M and 30C being oriented perpendicular to the circumferential direction wherein the middle portion 30M is projected forward relative to the lateral end portions 30B and 30C.

8 Claims, 3 Drawing Sheets

DIRECTIONAL ANNULAR ELASTIC TRACK

TECHNICAL FIELD

This invention relates to an annular elastic track for use in vehicles for civil engineering, construction works and agricultural works.

BACKGROUND OF THE INVENTION

Molded rubber tracks are in many cases being substituted for conventional metal tracks. Rubber tracks offer better maneuverability, better ride quality in rough fields, better flotation in wet areas, improved side hill stability, excellent traction, low maintenance and versatility compared to steel tracks.

Additionally, rubber tracks are replacing conventional rubber tires on tractor and other agricultural vehicles such as combines, trenchers, snow removers, spreaders, sprayers, wagons and carts, since rubber tracks are more friendly to agricultural fields, offer better flotation and less compaction than rubber tires, resulting in better crop yield. The use of rubber tractor tracks permits farmers to get in and out of fields earlier in the planting season and plant more crops as compared to rubber tire-equipped agricultural vehicles.

In civil engineering applications tracks are employed on many construction equipment type vehicles such as road pavers and the like. These tracks are generally made from steel or steel with urethane or rubber pads. These tracks require much maintenance and in the case of steel tracks the damage to paved surfaces is a serious problem. Also, these construction type tracks can be placed over pneumatic tires for skid steer equipment. A new advance in this area is the use of an all rubber steel cord track. The Goodyear Tire & Rubber Company provides such a track under the trademark TRACKMAN®, and the Bridgestone/Firestone Company provides a similar track under the name Firetrax®. These tracks have rubber lugs that extend across the entire width of the track. Each has swept back axially outer portions, which limits the amount of lateral extending edges. These tracks are good on paved surfaces, but are deficient in applications that have wet soil or loose sand and gravel. Additionally, the swept back outer ends create bending stresses on the underlying belt structure as the track bends over the wheels.

Rubber tracks are defined by an endless rubber belt reinforced with continuous flexible steel cables bonded into the rubber. Presently, a complete rubber track is molded flat in multiple sections, which are sequentially then bonded together during the curing process. Alternatively an endless rubber track can be made in annular form wherein the track is made from an uncured belt and a plurality of drive lugs wherein the drive lugs are urged into cavities formed in inner segments of a molding press, partially final formed and pressed onto the inner periphery of the belt, the belts and drive lugs are positioned in the molding press to be cured and molded together while treads are formed on the outer periphery of the belt. The drive lugs are finally formed and the completed belt is cooled and removed from the molding press forming an annular track as described in U.S. Pat. No. 6,051,178 issued Apr. 18, 2000, to the assignee, The Goodyear Tire & Rubber Company.

In each of the methods of manufacture the outer periphery has a plurality of spaced tread lugs. Generally in the prior farm tire art these tread lugs extend from each lateral edge of the track towards the center of the track terminating at the central location or mid-point of the track. These lugs generally take the appearance of agricultural tire lugs with a generally inclined but slightly more transverse extending inclination relative to the direction of travel. Lugs of this design have inherently experienced high wear patterns in the central location of the track. Additionally, these lugs have been staggered or are circumferentially off-set from one side of the track to the other. This helps insure that the track has sufficient bending moment as the track traverses over the drive wheels and guide wheels at each extremity of the elliptical shape track as it traverses in use. If the tread lugs extend from one side of the tracks lateral edge to the opposite side, then it is believed that the lugs must be perpendicular to the direction of the circumferential links of the track in order for the lugs to achieve appropriate bending moment in flexibility as it rotates around the drive wheels. For this reason, it is felt necessary to provide the tracks with two sets of lugs that act somewhat independently relative to the lugs set of the opposite side of the track so that the track itself can bend in a rather flexible nature. Absent this bending severe loads result in the belt reinforcing structure causing potential separations and other defects in the track itself as has been observed in some of the prior art rubber construction tracks previously mentioned.

It is an object of the present invention to provide a new directional tread pattern that can extend from one lateral side of the track to the opposite lateral side of the track in a continuous tread lug without adversely affecting the bending capability of the track as it traverses around the drive wheels. Another objective is to provide improved soil discharge at the lateral extremes of the track while increasing the wear properties of the track lugs based on its unique design.

SUMMARY OF THE INVENTION

A directional annular elastic track has guide lugs on the inner circumference and rubber tread lugs on the outer circumference and a thin band continuously extending in the circumferential direction. The thin band is circumferentially reinforced by substantially inextensible cords or bands. Preferably the cords or bands are steel reinforced materials.

The track has a plurality of spaced rubber tread lugs. Each rubber tread lug has a first lateral end portion, a middle portion and a second lateral end portion. Each portion is oriented perpendicular to the circumferential direction wherein the middle portion is projected forward relative to the lateral portions.

Each rubber tread lug is separated by a groove. The groove extends completely across the track and has a groove width ($W_M$) between the middle portions of adjacent lugs and a groove width ($W_L$) between the first and second lateral end portions of adjacent lugs. The groove width ($W_M$) is less than ($W_L$). Preferably the groove width ($W_M$) is 75% or less than the lateral groove width ($W_L$).

When one extends a plane perpendicular to the track circumferential length such that it lies within each groove and is centered in the groove between adjacent middle portions, the plane ($P_L$) intersects at most one groove wall in each of the lateral end portions of the tread lugs. The lugs have a radially outer tread surface located between a leading edge and a trailing edge. The leading edge and trailing edge are parallel over a majority of the lug length and in the middle portion protrudes toward the forward direction of travel of the track. The leading edge adjacent the middle portion extends at an amplitude ($A_L$) from the leading edge adjacent the lateral ends. The trailing edge adjacent the middle portion extends at an amplitude ($A_T$) relative to the trailing edges adjacent the lateral end portions. ($A_L$) is 125% or more than ($A_T$) as measured relative to the corresponding edges of the lateral end portions. As described above it is preferred that each of the lateral end portions is circumferentially aligned relative to the tracks direction of travel.

It is preferred that the lugs have a total lug length (L) and the middle portion has a length at least 50% of (L). In the preferred embodiment each lug lateral end portion has an outer chamfered lug wall extending in the circumferential direction.

These and other features and advantages of the present invention will become apparent from the following detailed description of the preferred embodiment which, when taken in conjunction with the accompanied drawings, illustrates by way of example the principles of the invention.

DETAILED DESCRIPTION OF THE INVENTION

Figure 1:
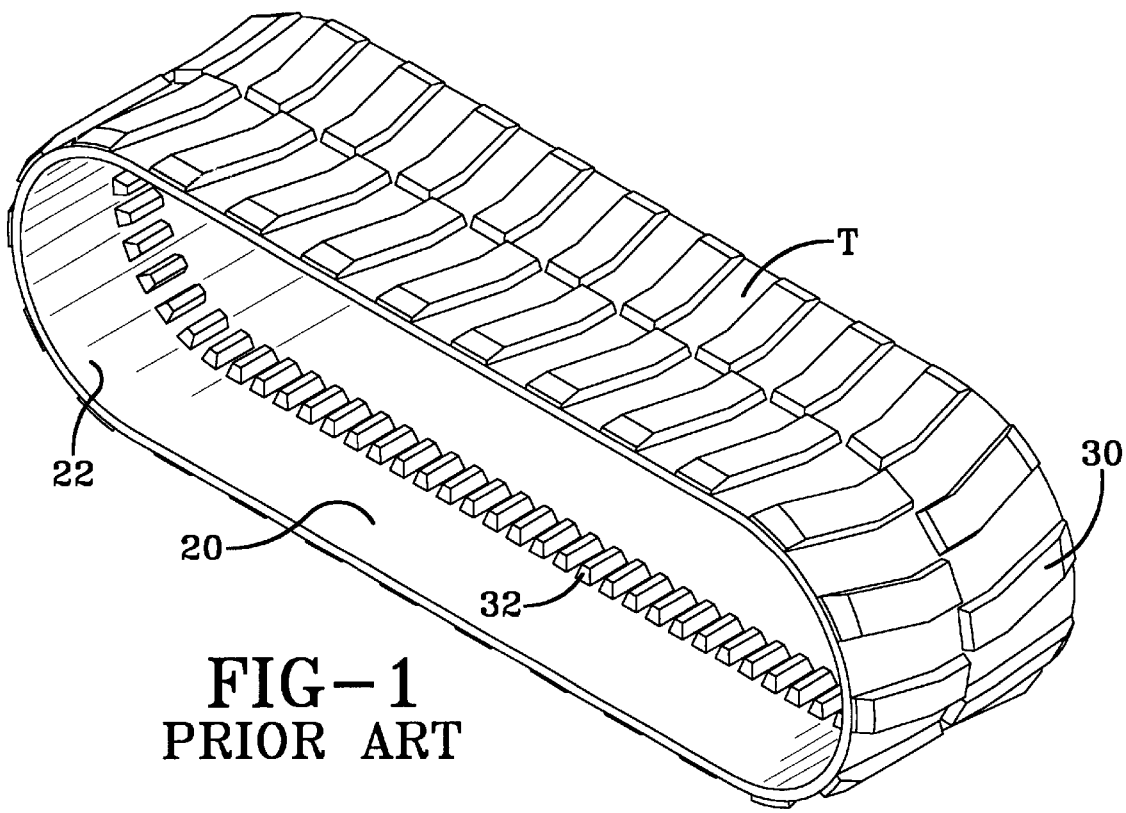
FIG. 1 is a perspective view of a completed prior art rubber track.
Figure 2:
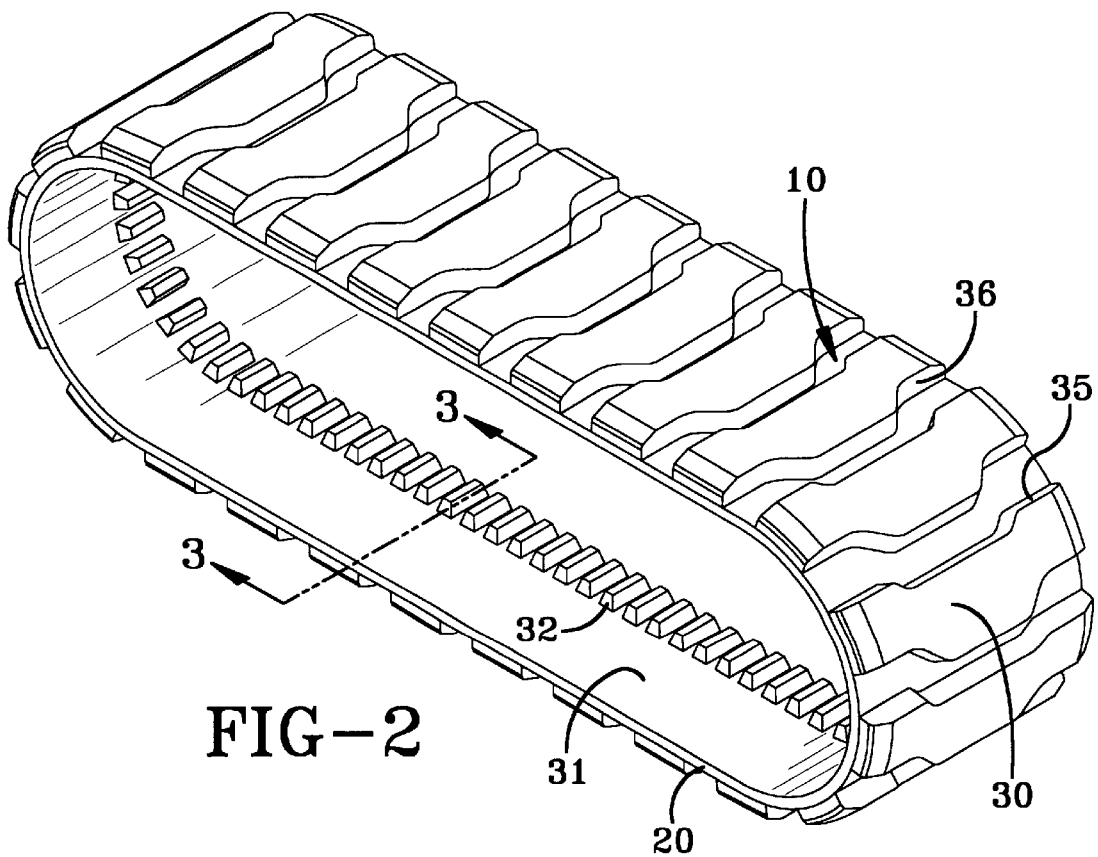
FIG. 2 is a perspective view showing a completed rubber track made in accordance with the present invention.
Figure 3:
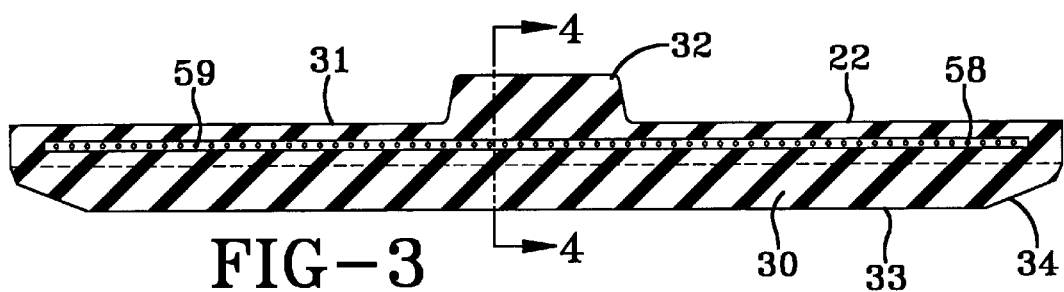
FIG. 3 is a cross-sectional view of the track taken along lines 3—3 of FIG. 2.
Figure 4:
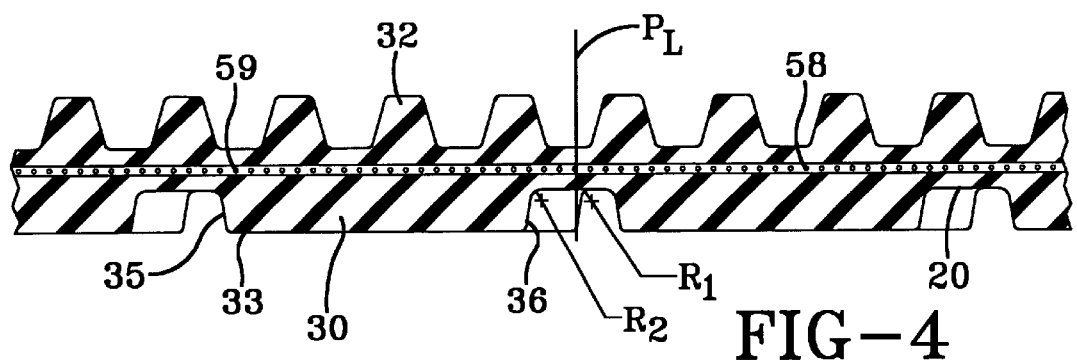
FIG. 4 is a cross-sectional view of the track taken along lines 44 of FIG. 3.

Referring to the drawings, in FIG. 1 there is shown a completed rubber track made according to the prior art. This track has a plurality of lugs 30 extending from each side of the lateral edges of the track towards the middle of the track. These lugs are designed somewhat similar to the lugs found on tractor tires. Such a track of the prior art comprises an endless band 20 formed of rubber calendered to encapsulate cord and wire cable. It will be understood that such a track is adapted to be positioned upon the wheels or rollers (not shown) of a motorized vehicle such as a tractor or the like to support the vehicle from movement along a desired surface such as an agricultural field. The exterior peripheral surface of band 20 is formed with integral tread lugs 30. The center portion of the inner peripheral surface of band 20 is formed with a plurality of conventional drive or guide lugs 32 which can engage complimentary sprockets (not shown) on the wheels or rollers of the drive vehicle which is supported by the track. With reference to FIGS. 2 through 4, the track of the present invention is shown.

FIG. 2 shows a perspective view of the track 10 wherein the tread lugs 30 extend across the entire outer peripheral surface of the track.

Figure 5:
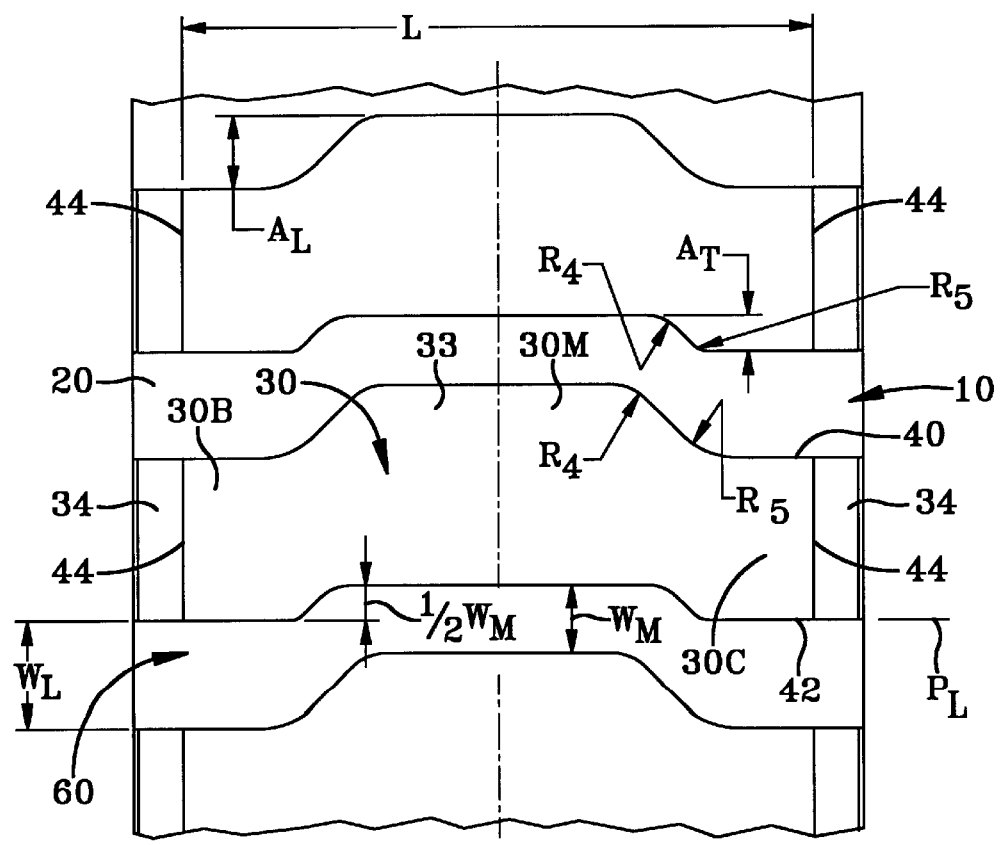
FIG. 5 is a partial plan view of a portion of the tracks tread lugs.

As shown in FIG. 3, the band 20 has a plurality of metallic or steel cables for reinforcement shown as 59 and 58 in the drawing encapsulated in rubber 22. The drive lugs 32 are shown in the central portion of the track 10 on its inner peripheral surface 31. The tread lugs 30 extend outward from the tread band 20 to an outer surface 33. Each tread lug 30 has a leading edge 40 and a trailing edge 42 as illustrated in FIG. 5 of the drawings. The distance between the leading edges 40 and the trailing edges 42 defines the lug width. Each lug has a chamfered lateral sidewall 34 extending outwardly to a lateral edge 44, in each of the lateral end portions of the tread lug 30B, 30C. The middle portion of each lug is designated 30M. Each lateral end portion 30B and 30C is circumferentially aligned as illustrated in the preferred tread pattern and the lateral end portions are equal in width. As illustrated in the preferred embodiment, the middle portion 30M projects forward relative to the lateral end portions 30B, 30C. Each rubber tread lug 30 is separated by a groove 60, the groove 60 extends completely across the track and has a groove width ($W_M$) between middle portions 30M of adjacent lugs and a groove width ($W_L$) between the first and second lateral end portions of adjacent lugs 30. The groove width ($W_M$) is less than the groove width ($W_L$).

The groove width ($W_M$) is preferably 75% or less than the lateral groove width ($W_L$) more preferably about 50% of the groove width ($W_L$).

The base of the groove 60 is defined by a full radius of curvature ($R_1$) in the preferred embodiment. In the area adjacent the middle portion 30M of the tread lug. At the lateral extremes of the middle portion near their lateral end portions 30B and 30C, the groove has a radius of curvature at the base of ($R_2$) wherein ($R_2$) is approximately two times the dimension of the radius ($R_1$).

As illustrated in FIG. 5 if one draws a plane ($P_L$) extending perpendicular to the tracks circumferential length the plane will lie within each groove and is centered in the groove at a location between adjacent middle portions of the tread lugs 30. When the plane is oriented in such a fashion it will be observed that at most one groove wall in each of the lateral end portions of the tread lugs is contacted. As illustrated, it is the groove walls adjacent the tread edge 42 and each of the lateral end portions 30B and 30C that is contacted. If one shifts the plane ($P_L$) towards the protruding middle portion 30M the adjacent lug to where it is tangent to the leading edge 40 in the middle portion of that tread lug, then the plane ($P_L$) still only contacts the groove wall extending inward of the trailing edge of the lug 30 as can be appreciated from the view of FIG. 5. This insures that the groove has a full open position as the track traverses around the drivewheels, this increases the bending flexibility of the track in a transverse relationship to the circumferential direction and enables the track to bend freely around the drivewheels without distorting contorting.

In a preferred embodiment it is believed desirable that the groove walls adjacent the trailing edge 42 at least in the lateral edge portions have a slope approaching vertical. In the illustrated embodiment all the groove walls had an inclination of approximately 20° as they extended towards the tread base. While this uniform bracing of the lugs is considered typical and facilitates molding, it is none-the-less believed advantageous in some cases to have the trailing edges in the lateral portions 30B and 30C vertical or having a close to zero degree taper to facilitate the bending of the track as it rolls around the drive wheels.

The lugs 30 have the radially outer tread surface 33 located between a leading edge 40 and a trailing edge 42. The leading edges 40 and trailing edges 42 are parallel over a majority the lugs length and in the middle portion the leading edge 40 protrudes towards the forward direction of travel. In a preferred embodiment illustrated in FIG. 5, both the leading edge 40 and the trailing edge 42 protrude toward the forward direction of the travel of the track. To better define this projection forward or protrusion forward it is noted that the leading edge 40 adjacent the middle portion 30M extends at an amplitude ($A_L$) from the leading edge 40 adjacent the lateral end portions 30B or 30C. The trailing edge 42 adjacent the middle portion extends an amplitude ($A_T$) relative to the trailing edge 42 adjacent the lateral end portions 30B or 30C. The amplitude AT, as illustrated, ranges from 0 to one-half the groove width at the middle portion (one-half $W_M$). It is believed preferable that the amplitude $A_L$ should be 125% or more than the amplitude $A_T$ as measured relative to the corresponding edges 40,42 of the lateral end portions 30A,30B.

It is believed preferable that the lugs 30 have a total lug length (L) and that the middle portion 30M should be at least 50% of the lug length (L). It is also believed desirable that each lug lateral end portion 30B, 30C has an outer chamfered lug wall 34 extending in the circumferential direction as illustrated in FIG. 5. The chamfered lug wall 34 extends to a generally vertical outer wall 37 that connects to the underlying band 20 of the track.

An important feature illustrated in FIG. 5 is that the groove 60 forms an effective soil discharge channel extending from the center of the track outwardly over the lateral edges of the track. The groove 60 opens up to a wider groove width ($W_L$) as the tread approaches the lateral edge. The opening of the groove 60 in this area facilitates the removal of soil and mud as the track 10 revolves around the drive wheels. By having the edges 34 of the tread lugs 30 chamfered a further volumetric increase occurs at the extreme lateral edges. All these features work in combination to create a very efficient system in discharging soil from the track as it revolves around the drive wheels.

An important feature to understand in the mechanism of these types of tracks is that the central portion wherein the drive wheels engage the guide lugs is an area where the track is subjected to generally high wear. The unique shape of the tread lugs 30 insure that the middle portion 30M has an enlarged surface area that is anywhere from 125% to 150% greater in the circumferential direction than the lateral edge portions. This increases the treadwear characteristics in this critical area. As illustrated, the leading edge and trailing edges are contoured with a radius $R_4$ and $R_5$ respectively as illustrated in FIG. 5.

As can be seen the leading edge 40 as it projects forward on the track creates an area that increases the lateral maneuverability of the track and provides some lateral resistance to slippage as the vehicle is traversing. This is particularly important when a track vehicle is working on a slope terrain or a contoured terrain where the vehicle is at a slight tilt. It is very important under these conditions that the track vehicle has some edges that will prevent the track from slipping. It is best accomplished at the lateral extremes along the walls 34 and 35, but additionally this track has the leading edge 40 projecting outward at the middle portion creating additional surfaces to resist lateral slipping. Effectively this creates a barrier to slippage almost down the entire length of the track and gives the track footprint much more resistance to any lateral slippage. This feature not only increases the ability to resist lateral slippage, but further enhances maneuverability in quick turning movements as it provides additional edges to facilitate the turning. At the location of the radius $R_4$ of the leading edge a pivot point is actually created that helps provide a good wear surface for pivoting on this location and each of the tread lugs. Applicants have found this extremely beneficial in turning maneuvers of a track vehicle.

A second beneficial feature of the track of the present invention over that of the prior art track is that the use of single lugs extending clear across the track width means that more lug edges are available for forward propulsion of the track vehicle. This is true because circumferentially offsetting lugs that are positioned only halfway across the track means that fewer lugs can be located on the track in order to insure sufficient spacing as illustrated in the prior art track of FIG. 1. Looking at FIG. 2 of the present invention these fully extending lugs 30 have an increase wear surface area in the middle, but also provide increased laterally extending edges and groove walls for forward and rearward propulsion of the track vehicle because the lugs can be more closely spaced while still providing sufficient soil discharge channels. This means that a larger surface area of the track is occupied by tread lugs. This means the track will wear at a far superior rate than the conventional prior art track, but additionally will have greater forward and rearward traction. It is anticipated based on just the surface area measurements that at least 50% more surface area is provided in the track of the present invention then that of the track illustrated in the prior art FIG. 1. This, in combination with the unique structure of the lugs, means that the track of the present invention should be at least 50% and likely to be almost 100% more durable in terms of treadwear then the prior art track. For the farmer, this means the track of the present invention should have a useful life twice as long as the track of the prior art when using similar comparative materials. In construction applications the inventive track will provide superior wear rates, as well, with better wet area traction capability, while protecting the pneumatic tires, if used with the track from puncture damage.

Figure 6:
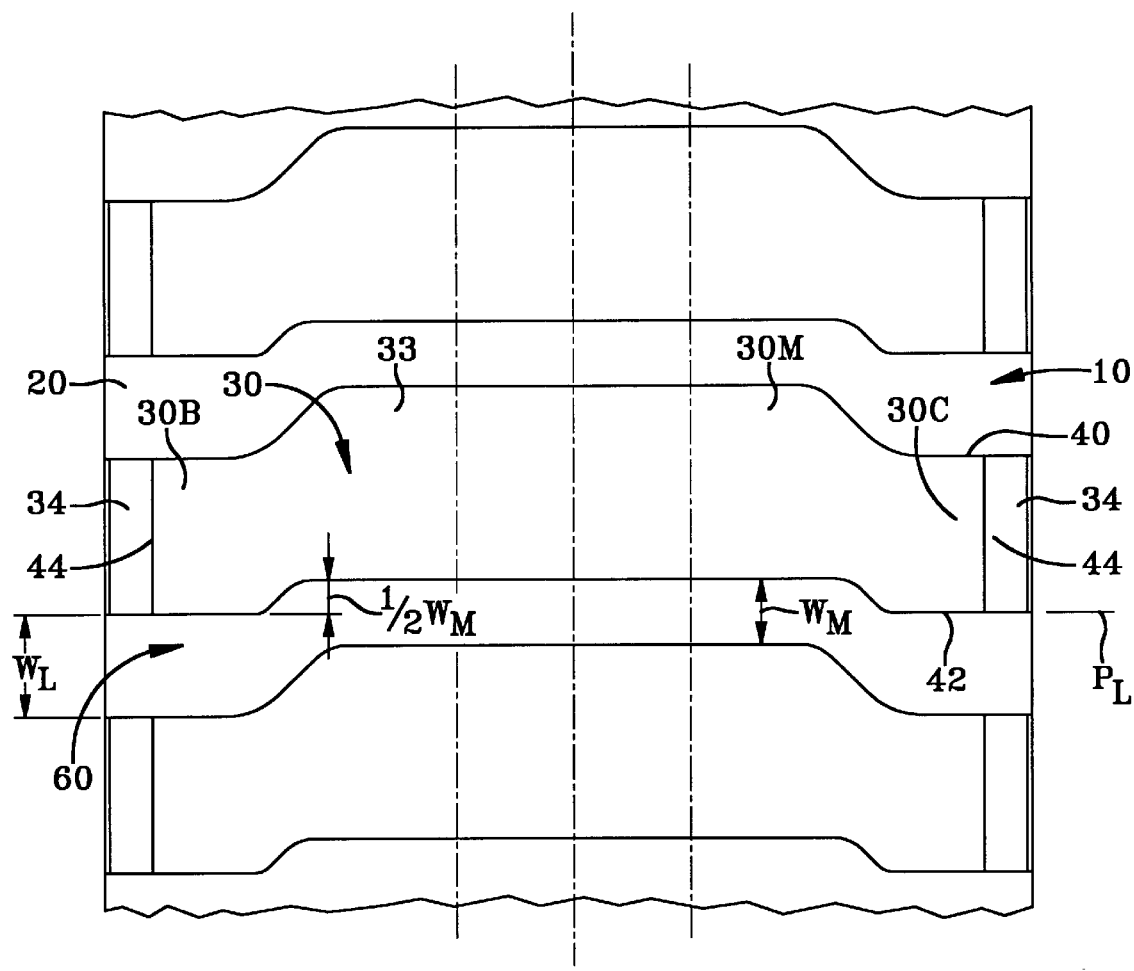
FIG. 6 is an expanded width track taken in a partial plan view of FIG. 5.

A second very beneficial feature of the present invention is that many tracks vary in length and in track width from approximately 12 to 15 inches in track width upwards to 36 inches in track width. The length of the track can change from a few feet spacing between the ecliptic ends to upwards of 20 feet or more in the larger track sizes. What is truly remarkable is that the lug pattern of the present invention is such that a mold can be made with center inserts that would allow the middle portion 30M of the lugs to be expanded outwardly while leaving the lateral edge portions the same. In other words, when one views the tread of FIG. 5 imagine placing an insert having the central portion only expanded by placing an insert in the platen that forms this section of the track. This feature is further illustrated in FIG. 6 wherein the track is shown in an expanded condition and the phantom lines show the original track of FIG. 5 expanded as shown by an insert placed between the parting line of the mold platen for producing the track tread. The advantage of this technique is that the soil discharge channels at the lateral extremes remain at the constant condition considered optimal for the track design regardless of the width of the track.

Alternatively, each lateral portion 30B,30C can be expanded by placing an insert in the lateral region thereby expanding the width of the lateral portions. Thirdly, each portion 30B,30C and 30M can be inserted to increase the track width while expanding the lugs 30 proportionally lengthwise.

What is claimed:

1. A directional elastic track having guide lugs on the inner circumference and rubber tread lugs on the outer circumference and a thin band continuously extending in the circumferential direction, the thin band having an exterior peripheral surface and an inner peripheral surface, the thin band being circumferentially reinforced by substantially inextensible cords or bands, the track comprising:

a plurality of spaced rubber tread lugs wherein the tread lugs extend laterally across the entire outer peripheral surface of the track, each having a first lateral end portion, a middle portion and a second lateral end portion, each portion being oriented perpendicular to the circumferential direction wherein the middle portion is projected forward relative to the lateral end portions.

2. The directional annular elastic track of claim 1 wherein each rubber tread separated by a groove, the groove extending completely across the track and having a groove width ($W_M$) between the middle portions adjacent lugs and a groove width $W_L$ between the first and second lateral ends portions of adjacent lugs, the groove width ($W_M$) being less than ($W_L$).

3. The directional annular elastic track of claim 2 wherein the groove width ($W_M$) is 75.0% or less than the lateral groove with($W_L$).

4. The directional annular elastic track of claim 2 wherein a plane ($P_L$) extending perpendicular to the track circumferential length lies within each groove and is centered in the groove between adjacent middle portions, the plane $P_L$ intersecting at most one groove wall in each of the lateral end portions of the tread lugs.

5. The directional annular elastic track of claim 2 wherein the lugs have a radially outer tread surface located between a leading edge and a trailing edge, the leading edge and trailing edges being parallel over a majority of the lug length and in the middle portion at least the leading edge protrudes toward the forward direction of travel of the track.

6. The directional annular elastic track of claim 5 wherein the leading edge adjacent the middle portion extends at an amplitude $A_L$ from the leading edge adjacent the lateral end and the trailing edge adjacent the middle portion extends at an amplitude $A_T$, $A_L$ being 125% or more than $A_T$ as measured relative to the corresponding edges of the lateral end portions.

7. The directional annular elastic track of claim 1 wherein the lug have a total lug length (L) the middle portion being at least 50% of (L) in length.

8. The directional annular elastic track of claim 1 wherein each lug lateral end portion has a outer chamfered lug wall extending in the circumferential direction.

* * * * *